No. 732,965. PATENTED JULY 7, 1903.
H. A. SCHERMERHORN.
FASTENING FOR WAGON END GATES.
APPLICATION FILED MAR. 16, 1903.
NO MODEL.
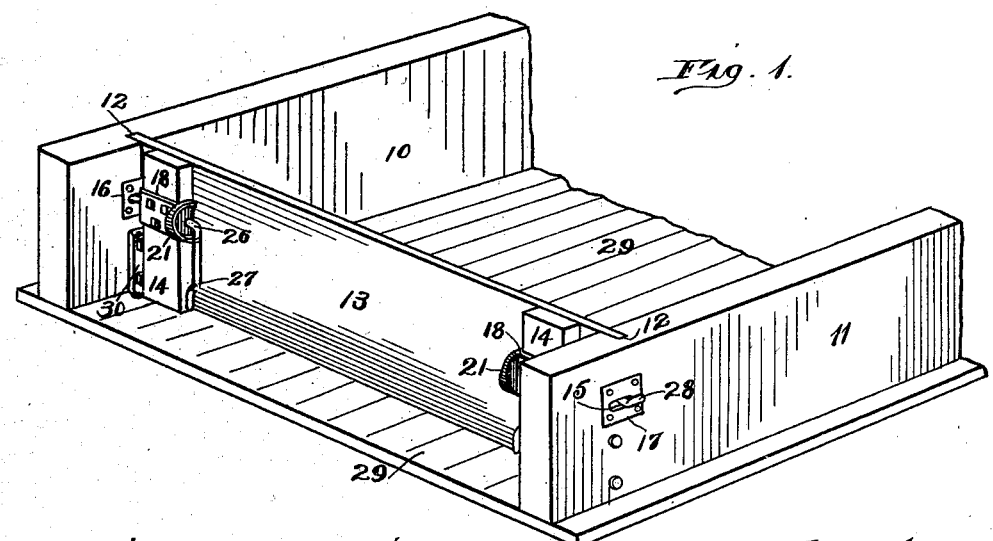
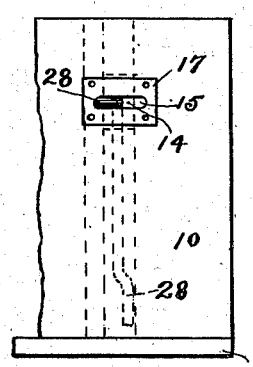
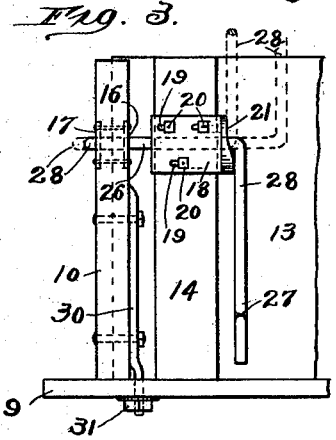
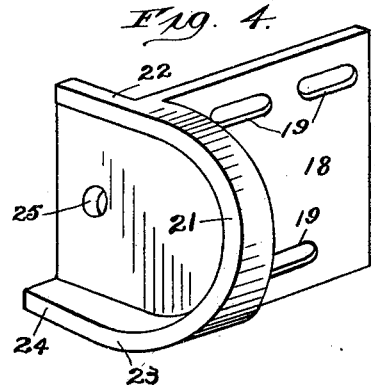
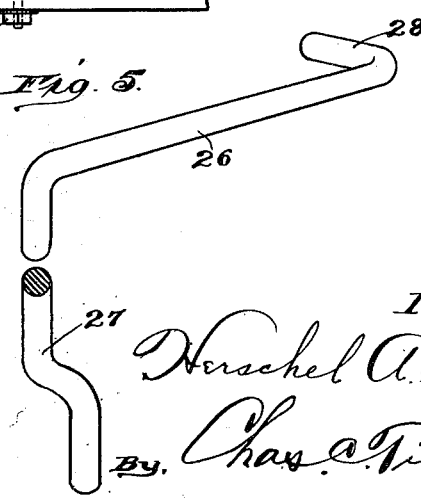
Witnesses: Chas. E. Gorton. A. Gustafson.
Inventor: Herschel A. Schermerhorn
By Chas. A. Tillman
Atty.

No. 732,965. Patented July 7, 1903.

UNITED STATES PATENT OFFICE.

HERSCHEL A. SCHERMERHORN, OF WATERMAN, ILLINOIS, ASSIGNOR OF ONE-HALF TO CLYDE S. MORSE, OF SHABBONA, ILLINOIS.

FASTENING FOR WAGON END-GATES.

SPECIFICATION forming part of Letters Patent No. 732,965, dated July 7, 1903.

Application filed March 16, 1903. Serial No. 147,943. (No model.)

*To all whom it may concern:*

Be it known that I, HERSCHEL A. SCHERMERHORN, a citizen of the United States, residing at Waterman, in the county of Dekalb and State of Illinois, have invented certain new and useful Improvements in Fastenings for Wagon End-Gates, of which the following is a specification.

This invention relates to improvements in means for securing the end-gates of wagon beds or bodies in place; and it consists in certain peculiarities of the construction, novel arrangement, and operation of the various parts thereof, as will be hereinafter more fully set forth and specifically claimed.

The principal object of the invention is to provide a fastening device for the end-gates of wagons which shall be simple and inexpensive in construction, strong, durable, and efficient in operation, and so made that the ordinary rods or bolts employed for connecting the sides of the wagon-body together and for holding the end-gates in place, which rods often become useless by reason of the loss of nuts used thereon or the screw-threads being worn off or the rods themselves being lost or bent, may be dispensed with.

Another object of the invention is to furnish fastening means of such a character that there will be no detachable parts to become mislaid or lost when the end-gates are removed, but, on the other hand, will be permanently attached to the end-gates and sides of the wagon-body ever ready for use.
A further object is to afford a fastening which shall be positive in its engagement and so made as to prevent accidental disengagement by reason of jolts or vibrations of the wagon.
Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a perspective view of the rear portion of a wagon-body, showing an end-gate secured in place thereon by means of my improved fastening. Fig. 2 is a view in side elevation of a portion of one side of the box or body. Fig. 3 is a rear view in elevation of a part of the body, showing a portion of the end-gate secured thereon and illustrating by continuous lines the positions the parts of the fastening will assume when the end-gate is fastened in position and by dotted lines the positions they will assume when it is desired to remove the end-gate. Fig. 4 is a detached perspective view of one of the adjustable cam-plates of the fastening, and Fig. 5 is a detached perspective view of one of the securing cranks or rods.

Like numberals of reference refer to corresponding parts throughout the different views of the drawings.

The reference-numerals 10 and 11 represent the sides of the wagon box or body, which may be of the ordinary or any preferred construction. Each of these sides is provided on its inner surface near its end with a vertical groove 12 to receive the ends of the end-gate 13, which is provided near each of its ends, and preferably on its outer surface, with transverse cleats or strips 14, to which the adjustable cam-plates are secured, as will be presently explained. Each of the sides of the body is provided near the groove or rabbet 12 therein with a horizontal elongated opening 15 for the reception and operation of the outer ends of the securing cranks or rods. In order to prevent the sides of the body becoming worn by the use of said cranks or rods, plates 16 and 17 are secured by means of rivets or bolts to the inner and outer surfaces thereof, respectively. Each of these plates is provided with a horizontal elongated opening to register and correspond with the openings 15 in the sides of the body. Secured to the upper portion of each of the cleats or transverse pieces 14 on the end-gate 13 is an adjustable cam-plate, which consists of a flat portion 18, having a series of slots or elongated openings 19 to receive bolts 20, which pass through the end-gate and cleats thereon. On its inner end the said flat portion 18 is formed with an outwardly-extending cam-shaped flange 21 and with an inwardly-extending lug or portion 22 to rest against the sides of the cleats 14, as is clearly shown in Fig. 1 of the drawings. By reference to Figs.

1, 3, and 4 of the drawings it will be seen that the flange 21 is curved and is enlarged from its upper portion to a point, as at about 23, when it is again inwardly tapered, as at 24. (See Fig. 4 of the drawings.)

Each of the inwardly-extending portions 22 of the adjustable cam-plates is provided with an opening 25 for the reception and operation of the horizontal part 26 of the securing cranks or rods, which are bent to form at their inner ends a downwardly-projecting portion 27 and at their outer ends a lateral projection 28 to engage the outer surface of the sides of the body or the plates 17 thereon when the latter are employed. The horizontal portion 26 of each of the securing cranks or rods, as before stated, is located in the openings 25 of the adjustable cam-plate, as well as in a suitable transverse opening in the cleat 14, to which said plate is secured, and extends through the opening 15 in the side of the body, so that the downward extension of the crank will rest against the edge of the cam-shaped flange 21 and the lateral projection 28 will engage the outer surface of one of the sides of the body. By raising the part 27 from the position shown by continuous lines in Fig. 3 of the drawings to that illustrated by dotted lines or to a vertical position it is apparent that the position of the lateral extension 28 will be reversed from the position shown in Figs. 1 and 2, so that said lateral extension may be withdrawn from the side of the body and its plate, which may be done by moving the downward extension 27 in the proper direction or toward the opposite side of the body, when the lateral projection 28 will impinge the outer surface of the cleat 14, and thus prevent its further inward movement.

By employing cam-shaped flanges 21 on the adjustable plates 18 it is apparent that said plates may be suitably adjusted on their respective cleats and that the sides of the body may be drawn inwardly, so as to firmly hold the end-gate in position, by reason of the action of the downward extensions 27 on the cam-flanges 21, which, as before stated, are enlarged toward their lower portions and then taper inwardly. As the extensions 27 are pressed downwardly after the horizontal portion 26 and lateral extension 28 of each of the securing-cranks have been passed through the openings in the sides of the body, it is evident that said downward extensions will be moved inwardly, thus drawing the sides of the body inwardly until said downward extensions have passed over the enlarged portions 23 of the cam-flanges onto the inwardly-tapered portions 24, by means of which enlarged portions they will be held against accidental dislocation by reason of the jarring or vibrations of the wagon. In the drawings I have shown the sides 10 and 11 secured to the bottom 29 by means of clips 30, the lower ends of which pass through the bottom and are held in place by nuts 31, as usual.

Having thus fully described my invention, what I claim as new, and desire to secure by Letters Patent, is—

1. In a fastening for wagon end-gates, the combination with the sides of the body, each provided with an elongated opening near its end, of an end-gate located therebetween, a plate attached to the end-gate near each of its ends and having an upright cam, the said cams facing one another, a securing-crank journaled horizontally on each end of said gate and carried thereby and comprising a horizontal portion provided at its outer end with a lateral extension and at its inner end with a downward extension to impinge and engage the cam whereby the sides of the body are drawn toward each other, substantially as described.

2. In a fastening for wagon end-gates, the combination with the sides of the body, each provided with an elongated opening near its end, of an end-gate located therebetween, a plate adjustably attached to the end-gate near each of its ends and having an upright cam enlarged toward its lower portion and then tapered, a securing-crank journaled horizontally on each end of said gate and comprising a horizontal portion provided at its outer end with a lateral extension and at its inner end with a downward extension to impinge and engage the cam, substantially as described.

3. In a fastening for wagon end-gates, the combination with the sides of the body, each provided with an elongated opening near its end, of plates secured to the sides and having openings to register with the openings therein, an end-gate located between the sides and having near each of its ends a transverse cleat, a plate attached to each of said cleats, and each of said plates having an upright cam, a securing-crank journaled horizontally in each of the cam-plates and cleats, and comprising a horizontal portion provided at its outer end with a lateral extension and at its inner end with a downward extension to impinge the cam, substantially as described.

HERSCHEL A. SCHERMERHORN.

Witnesses:
CHAS. C. TILLMAN,
A. GUSTAFSON.